United States Patent Office 2,741,627
Patented Apr. 10, 1956

2,741,627

PRODUCTION OF CURIUM 243

Stanley G. Thompson, Richmond, Burris B. Cunningham, Berkeley, and Albert Ghiorso, Alameda, Calif., assignors to the United States of America as represented by the United States Atomic Energy Commission No Drawing. Application June 28, 1950,
Serial No. 170,962

4 Claims. (Cl. 260—429.1)

This invention relates to a new isotope of curium and a method of producing the same.

It has been the goal of an extensive search by many workers in the field of transuranium elements to find the heavy isotopes of the newly discovered and created elements which lie above uranium in the Periodic System.

The present invention is predicated upon the discovery that the bombardment of americium 241 with alpha particles in a cyclotron produces the isotope of curium having a mass number of 243 which was heretofore unknown.

Accordingly, it is an object of the invention to produce the isotope of curium having a mass number of 243.

Another object of the invention is to provide a synthetic isotope of mass number 243 and atomic number 96.

A further object of the invention is to provide methods for producing the isotope of curium having a mass number of 243 and an atomic number of 96.

The invention as to its characteristics, together with further objects and advantages thereof, will become apparent by reference to the following specification.

With the development of chain reacting piles as a source of high mass numbered elements, in particular the element americium, a starting material was available for experiments having as an object the production of isotopes having even higher mass numbers. Utilizing said starting material, applicant produced the curium isotope 243 by the bombardment technique which is set forth generally as follows: An americium 241 target is prepared and bombarded with a beam of 40 m. e. v. helium ions from a cyclotron thereby producing a nuclear transformation of the americium 241 yielding the isotope of curium having a mass number of 243. Since other nuclear reactions also occur during the helium ion bombardment, the curium isotope is found associated with a variety of impurities including lanthanide elements and, of course, a considerable quantity of the original americium. Said curium isotope may be detected and identified in the following manner: The target is treated chemically to remove the bombarded material and the removed material is chemically fractionated into americium and curium fractions. The curium isotope 243 content may then be determined by performing an alpha pulse analysis on the curium fraction. Specific details of the process will become more apparent by a consideration of the following example illustrating the production of said isotope.

Example

Americium 241 was formed into a target by placing a quantity of americium nitrate in a grooved platinum dish of 0.1 cm.² area, then removing the water under an infra-red heat lamp and igniting the residue to form the black oxide of americium. The dish containing the americium 241 oxide was then bombarded with a beam of 40 m. e. v. alpha particles from a cyclotron with a total bombardment of 1 microampere hour. After bombardment the americium oxide, which now contained the curium isotope 243, was dissolved from the target by means of nitric acid and then the hydroxide was precipitated by the addition of ammonia. This hydroxide was dissolved in 45% potassium carbonate solution and the americium was precipitated by the addition of sodium hypochlorite and with heating the solution as the insoluble americium compound which presumably is $KAmO_3$. Curium is not oxidized to a higher oxidation state by this procedure and is not carried by this compound. The americium and curium remaining in the solution were then precipitated as hydroxides by the addition of concentrated potassium hydroxide; the cycle set forth above was then repeated and the resulting precipitate was combined with that previously obtained. These two steps separated the americium from the curium by a factor of about 2000. Further separation of the americium from curium was made by adsorption of the mixture on a column packed with (Dowex 50), a cationic exchange resin and by elution with ammonium citrate solution. Dowex 50 resin is a sulfonated polymer of a poly-vinyl aryl compound such as that described in U. S. Patent 2,366,007 (G. F. D'Alelio, August 11, 1942).

The presence of the curium isotope 243 in the curium fraction was determined by an alpha pulse analysis using a differential pulse analyzer. In the multichannel differential pulse analyzer, such as applicant employed, a thin sample is placed in an ionization chamber in which the total ionization of an alpha particle is measured as a voltage pulse. Individual pulses are then sorted electronically and recorded on a number of fast mechanical registers in such a way as to distinguish the individual alpha particle energies of a mixture of alpha emitters. The results of the pulse analysis of the curium fraction indicated presence of a substantial number of alpha particles included in a lower energy group having an energy of about 5.78 m. e. v., which can not be attributed to known isotopes. From a consideration of the possible nuclear reactions it was determined that said alpha particles were being emitted by an unknown isotope of curium which should have a mass number of 243. The discovered alpha energy is in close agreement with that which can be predicted for an element of such a mass number from theoretical considerations.

The possible nuclear reactions for the formation of the new isotope are postulated as follows:

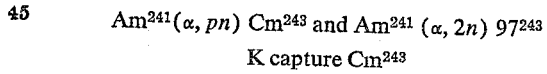

An estimate of the half-life of $Cm^{243}$ was made from consideration of the yields of nuclear reactions in the heavy region. In this region of the periodic system the sum of the cross sections for the $\alpha$, $2n$ and the $\alpha$, $pn$ reactions for bombardments of the type used by applicant is about the same order of magnitude as the sum of the $\alpha$, $3n$ and $\alpha$, $p2n$ reactions and is of the order of 0.01 barn. Since $Cm^{243}$ produced showed a percentage of the count, i. e., $Cm^{243}$ showed 5% as much alpha activity as $Cm^{242}$, and the number of atoms produced by the bombardment is about the same, the half-life of $Cm^{243}$ is about 20 times as long as that of $Cm^{242}$ or about eight years. Extension of the tables for prediction of the half-life, such as that found in Chem. Ltg. 41, 315 (1938) from the work of J. Schintlmeister, gives a value for the half-life of about 9–10 years for such a mass numbered isotope, thus it may be seen that there is close agreement between that predicted and the value actually found. While the foregoing estimates and predictions of half-lifes appeared valid in the earliest experiments, later findings indicate that curium isotope 243 actually has a half-life of about 35.0 years.

From the chemical separation and characterization, the pulse analysis, and the bombardment and radiation characteristics, the new isotope can be said with a high degree of certainty to be curium 243.

While there has been described what is, at present, considered to be the preferred embodiment of the invention, it will be understood that various modifications may be made therein, it is intended to cover all such modifications as fall within the scope of the appended claims.

What I claim is:

1. A method for producing the isotope of curium having a mass number 243 comprising bombarding an americium 241 oxide target with about 40 m. e. v. alpha particles, dissolving the target and the resultant isotopes, preparing a carbonate solution of said target and isotopes, precipitating the americium from the carbonate solution containing curium and impurities by means of sodium hypochlorite, further separating said americium and curium by means of adsorption on an ion exchange resin and selective elution from said resin.

2. In a process for producing the isotope of curium having a mass number 243, the steps comprising bombarding a target of americium 241 with alpha particles of about 40 m. e. v. energy to produce curium 243 therein, dissolving said target in nitric acid yielding a solution containing the residual americium, the produced curium 243 and impurities, precipitating the curium 243, americium and at least some of the impurities as the hydroxide with ammonia, dissolving the precipitate in carbonate solution, precipitating americium from the solution by treatment with sodium hypochlorite and with heating, precipitating the residual americium and curium 243 from the solution by treatment with concentrated alkali metal hydroxide, repeating the foregoing steps to effect a further separation of americium from the curium, adsorbing the remaining mixture of materials including americium and the curium 243 on a cationic exchange resin, and then eluting the curium from the resin with ammonium citrate elutriant yielding a solution of separated curium 243.

3. A method of producing curium 243 comprising, bombarding americium 241 oxide with about 40 m. e. v. alpha particles, dissolving the bombardment product material in nitric acid, precipitating americium from the nitric acid solution by means of ammonium hydroxide, redissolving the precipitate in carbonate solution, precipitating americium from the carbonate solution by treatment with sodium hypochlorite, separating the americium precipitate from the solution with the curium remaining in the solution, adsorbing said curium upon an ion exchange resin, and eluting said curium from said resin.

4. In a process for producing the isotope curium 243, the steps comprising producing an americium 241 target, bombarding said target with alpha particles of about 40 m. e. v. energy to produce curium isotope 243 and impurities therein, dissolving the americium, curium isotope 243 and impurities from said target with nitric acid, precipitating americium and curium isotope 243 therefrom with ammonia, dissolving the precipitate in potassium carbonate solution, precipitating americum away from curium isotope 243 in the solution with sodium hypochlorite, then treating the precipitate in an ion exchange column by adsorption thereon and elution with ammonium citrate solution to separate the curium isotope 243 from the remaining americium.

References Cited in the file of this patent

Seaborg: Chem. Eng. News, vol. 23 (1945), pp. 2190–93.

Seaborg: Plutonium and Other Transuranium Elements, A. E. C. declassified paper MDDC 505 (November 19, 1946), pp. 1–9.

Seaborg: Chem. Eng. News, vol. 25 (1947), pp. 358–60 and 397.

Seaborg et al.: The Transuranium Elements, A. E. C. declassified paper MDDC–1609 (March 24, 1947), p. 3.

Harvey: Nucleonics, vol. 2 (April 1948), p. 1.

Chem. and Eng. News, vol. 28, No. 5, p. 326 (January 30, 1950).